United States Patent
Modeel

(10) Patent No.: US 11,113,049 B2
(45) Date of Patent: Sep. 7, 2021

(54) DEPLOYING APPLICATIONS IN A COMPUTING ENVIRONMENT

(71) Applicant: Red Hat, Inc., Raleigh, NC (US)

(72) Inventor: Subin Modeel, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 88 days.

(21) Appl. No.: 16/285,091

(22) Filed: Feb. 25, 2019

(65) Prior Publication Data

US 2020/0272459 A1 Aug. 27, 2020

(51) Int. Cl.
*G06F 9/44* (2018.01)
*G06F 8/77* (2018.01)
*G06F 8/41* (2018.01)

(52) U.S. Cl.
CPC .............. *G06F 8/77* (2013.01); *G06F 8/443* (2013.01); *G06F 8/447* (2013.01)

(58) Field of Classification Search
None
See application file for complete search history.

(56) References Cited

U.S. PATENT DOCUMENTS

| | | | | |
|---|---|---|---|---|
| 7,047,495 B1* | 5/2006 | Pang | ........................ | G06F 8/38 715/736 |
| 8,972,975 B1* | 3/2015 | Rogers | ...................... | G06F 8/77 717/175 |
| 9,727,330 B2 | 8/2017 | Parees et al. | | |
| 9,983,891 B1 | 5/2018 | Christensen | | |
| 2006/0117101 A1* | 6/2006 | Lauer | ...................... | H04L 69/28 709/224 |
| 2008/0126788 A1* | 5/2008 | Kreek | ................... | G06F 9/4411 713/100 |
| 2008/0130639 A1* | 6/2008 | Costa-Requena | ....... | H04L 67/16 370/389 |
| 2008/0184072 A1* | 7/2008 | Odlivak | .............. | G06F 11/3628 714/32 |
| 2009/0197640 A1* | 8/2009 | Fa | ....................... | H04M 1/6075 455/556.1 |

(Continued)

OTHER PUBLICATIONS

Lewis, "Advanced Scheduling in Kubernetes", located at https://kubernetes.io/blog/2017/03/advanced-scheduling-in-kubernetes/, Mar. 31, 2017, 13 pages.

(Continued)

*Primary Examiner* — Anna C Deng
(74) *Attorney, Agent, or Firm* — Womble Bond Dickinson (US) LLP

(57) ABSTRACT

Deploying applications in a computing environment. A method of the disclosure includes determining that a first computing device has been added to a computing environment comprising a plurality of computing devices. The first computing device includes a first component is not included in the plurality of computing devices. The method also includes determining, by a processing device, whether a performance of a first application may be improved in view of the first computing device and a plurality of benchmark applications. The first application is within the computing environment. The method further includes recompiling the first application for execution on the first computing device, in response to determining that the performance of the first application may be improved.

18 Claims, 6 Drawing Sheets

(56) References Cited

U.S. PATENT DOCUMENTS

| | | | |
|---|---|---|---|
| 2009/0307763 A1* | 12/2009 | Rawlins | G06F 11/3672 |
| | | | 726/5 |
| 2010/0313194 A1* | 12/2010 | Juneja | G06F 8/65 |
| | | | 717/171 |
| 2014/0337493 A1* | 11/2014 | Tung | H04L 41/0806 |
| | | | 709/222 |
| 2017/0052775 A1* | 2/2017 | Byrnes | H04L 67/34 |
| 2018/0146069 A1 | 5/2018 | Du et al. | |
| 2018/0173502 A1 | 6/2018 | Biskup et al. | |
| 2018/0225137 A1* | 8/2018 | Bianchini | G06F 9/5005 |
| 2018/0241617 A1* | 8/2018 | Radzikowski | G06F 8/656 |
| 2020/0218526 A1* | 7/2020 | Byrnes | H04L 29/04 |

OTHER PUBLICATIONS

"Practical Guide to Platform-as-a-Service Version 1.0", located at http://www.cloud-council.org/CSCC-Practical-Guide-to-PaaS.pdf, Sep. 2015, 31 pages.

* cited by examiner

DEPLOYING APPLICATIONS IN A COMPUTING ENVIRONMENT

TECHNICAL FIELD

Aspects of the present disclosure relate to deploying, and more particularly, to recompiling and deploying applications in a computing environment.

BACKGROUND

An application may be one or more programs (e.g., computer programs), software, etc., that may be used by users, other applications, devices, etc., to perform various tasks, actions, functions, operations, methods, processes, calculations, computational operations, etc. Examples of applications include machine learning applications (e.g., artificial intelligence (AI) applications, neural networks, etc.), web applications, enterprise applications, consumer applications, mobile applications, etc.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, an application may be one or more programs (e.g., computer programs), software, etc., that may be used by users, other applications, devices, etc., to perform various tasks, actions, functions, operations, methods, processes, calculations, etc. Applications may execute on computing devices that are in a computing environment. For example, the applications may execute on physical devices (e.g., physical computing devices), virtual machines, containers, etc., in the computing environment (e.g., a cloud computing environment). The applications may be compiled for existing computing devices in the computing environment. Thus, the applications may not be able to take advantage of components (e.g., new hardware, new software, etc.) that may be in new computing devices or that may added to existing computing devices.

Some embodiments of the present disclosure address the above-noted and other deficiencies by detecting or determining when a computing device is added or modified. The new or modified computing device may include new components that were not previously in the computing environment. This may allow benchmark applications to be recompiled and executed to determine whether the performance or functionality of other applications may be improved if the other applications are executed on the new or modified computing device. If there is a performance or functionality improvement, the other applications may be recompiled for the new or modified computing device. This may further allow the applications to be executed more quickly and efficiently.

Figure 1:
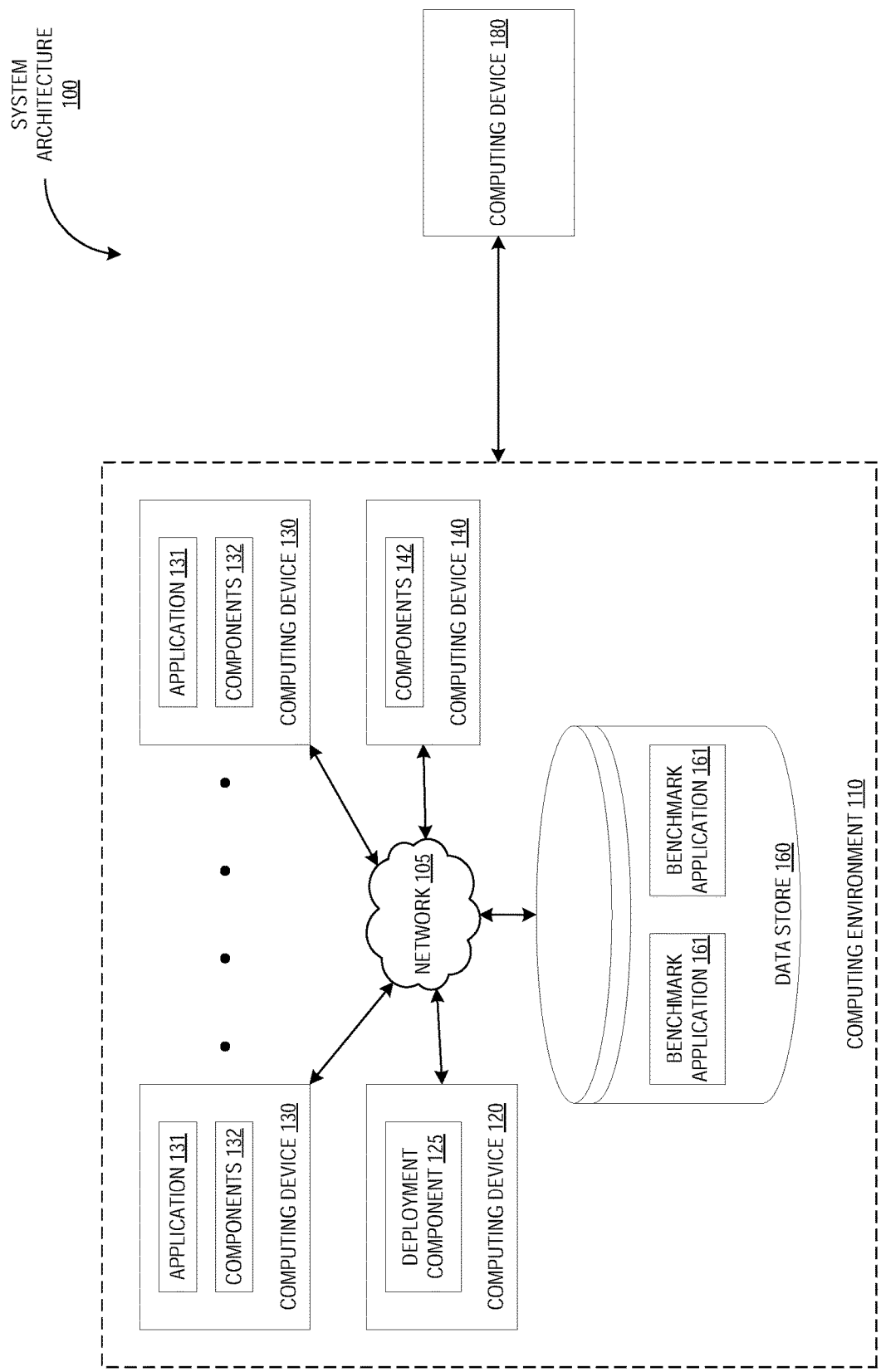
FIG. 1 is a block diagram that illustrates an example system architecture, in accordance with some embodiments of the present disclosure.

FIG. 1 is a block diagram that illustrates an example system architecture 100, in accordance with some embodiments of the present disclosure. The system architecture 100 includes a computing environment 110 and computing device 180. The computing environment 110 includes computing device 120, computing devices 130, computing device 140, a data store 160 and a network 105. In one embodiment, the computing environment 110 may be a platform as a service (PAAS) environment or system. For example, the computing environment 110 may be a cloud computing environment or system.

The computing devices 120, 130, 140, and the data store 160 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (Wi-Fi) hotspot connected with the network 105 and/or a wireless carrier system that can be implemented using various data processing equipment, communication towers (e.g. cell towers), etc. The network 105 may carry communications (e.g., data, message, packets, frames, etc.) between computing devices 120, 130, 140, and the data store 160.

The data store 160 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The computing device 180 may be coupled to the development system 101 via another network (not illustrated in FIG. 1) or via the network 105. Although the computing device 180 (and the resource component 181) is illustrate as separate from the computing environment 110, the computing device 180 (and the resource component 181) may be part of the computing environment 110 in other embodiments.

In one embodiment, a computing device (e.g., computing devices 120, 130, 140, and 180) may be a physical device that may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, laptop computers, tablet computers, smartphones, set-top boxes, etc. In some examples, the computing devices may comprise a single machine or may include multiple interconnected machines (e.g., multiple servers configured in a cluster). Each computing device may execute or include an operating system (OS), as discussed in more detail below. The OS of a computing device may manage the execution of other components (e.g., software, applications, etc.) and/or may manage access to the hardware (e.g., processors, memory, storage devices etc.) of the computing device.

In another embodiment, a computing device (e.g., computing devices 120, 130, 140, and 180) may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. A VM may be, for example, a hardware emulation, a full virtualization, a para-virtualization, and an operating system-level virtualization VM. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. For example, the hypervisor, though typically implemented in software, may emulate and export a bare machine interface to higher level software in the form of virtual processors and guest memory. Higher level software may comprise a standard or real-time operating system (OS), may be a highly stripped down operating environment with limited operating system functionality, may not include traditional OS facilities, etc. The hypervisor may present other software (i.e., "guest" software) the abstraction of one or more virtual machines (VMs) that provide the same or different abstractions to various guest software (e.g., guest operating system, guest applications). A virtual machine may execute guest software that uses an underlying emulation of the physical resources (e.g., virtual processors and guest memory).

In a further embodiment, a computing device (e.g., computing devices 120, 130, 140, and 180) may be container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. For example, the container engine may multiplex the binaries and/or libraries of the host OS between multiple containers. The container engine may also facilitate interactions between the container and the resources of the computing device. For example, the container engine may manage requests from container to access a memory (e.g., a RAM) of the computing device. In another example, the container engine may manage requests from the container to access certain libraries/binaries of the host OS. The container engine may also be used to create, remove, and manage containers. In one embodiment, the container engine may be a component of a host operating system. In another embodiment, container engine may run on top of a host operating system, or may run directly on host hardware without the use of a host operating system.

As illustrated in FIG. 1, each computing device 130 includes an application 131. An application 131 may be one or more programs (e.g., computer programs), software, etc., that may be used by users, other applications, devices, etc., to perform various tasks, actions, functions, operations, methods, processes, calculations, etc., as discussed above. For example, applications 131 may be a machine learning applications (e.g., artificial intelligence (AI) applications, neural networks, etc.), web applications, enterprise applications, consumer applications, mobile applications, etc. Each computing device 130 also includes components 132. A component 132 may be hardware (e.g., a processing device, a storage device, a network communication device, etc.), virtual hardware (e.g., a virtual device such as a virtual processing device), software (e.g., an operating system (OS), an application, a service, a software library), firmware, or a combination thereof. For example, each computing device 130 may include a processing device, such as a central processing unit (CPU), a graphics processing unit (GPU), etc.). In another example, each computing device 130 may also include an OS. In a further example, each computing device 130 may include a storage device (e.g., a memory, a cache, random access memory (RAM), a hard disk drive (HDD), a solid state disk (SSD), etc.). In a further example, each computing device 130 may include a network communication device (e.g., a network interface card, a wireless card, etc.). In another example, each computing device 130 may include one or more software libraries. For example, each computing device 130 may include a software library to perform different types of computational operations (e.g., matrix multiplications, tensor operations, floating point multiplications, etc.). Each computing device may also execute (e.g., run) an application 131 (or other applications).

In one embodiment, computing device 120 may be one or more server computers. For example, the computing device 120 may be a single computing device or may be a collection or cluster of computing devices that may be interconnected (e.g., interconnected via network 105). The computing device 120 includes deployment component 125. The deployment component 125 may be hardware, software, firmware, or combination thereof. In addition, the deployment component 125 may include multiple sub-components (or sub-modules) as discussed in more detail below.

In one embodiment, the deployment component 125 may determine that a computing device has been added to the computing environment 110 (e.g., a new computing device 140 has been added to the computing environment 110). For example, the deployment component 125 may determine (e.g., detect) that the computing device 140 has been added to the computing environment 110. The computing device 140 may register with the deployment component 125 or another computing device (e.g., another server computer) when the computing device 140 is added to the computing environment 110. For example, the computing device 140 may transmit messages, frames, packets, or other information indicating one or more of an identifier for the computing device 140, a network address (e.g., an internet protocol (IP)

address) for the computing device 140, the components 142 that are in the computing device 140, etc. The computing device 120 may receive the messages, frames, packets, or other information from the computing device 140 or the other computing device (e.g., the other server computer). As discussed above, examples of components 142 may include processing devices (e.g., a CPU, a GPU, etc.), a storage device or memory (e.g., RAM, HDD, SSD, etc.), a network communication device (e.g., a network interface card), an operating system, a software library, etc.

In one embodiment, the deployment component 125 may determine whether the performance or functionality of a first application 131, may be improved in view of the computing device 140 (e.g., a new computing device or a modified computing device) and one or more benchmark applications 161. For example, the deployment component 125 may execute one or more of the benchmark applications 161 on the computing device 140 to determine whether the performance of the one or more benchmark applications 161 is improved. In another example, the deployment component 125 may determine whether functions of one or more benchmark applications 161 may be improved. As discussed above, the first application 131 may perform various tasks, actions, functions, operations, methods, processes, calculations, computational operations, etc. The benchmark applications 161 may also perform one or more of the tasks, actions, functions, operations, methods, processes, calculations, computational operations, etc., performed by the first application 131. Thus, executing the benchmark applications 161 on the computing device 140 may help or allow the deployment component 125 to determine whether there may be improvement in performance or functionality if the first application 131 were executed on the computing device 140.

In one embodiment, the deployment component 125 may use one or more performance criteria to determine whether the performance of the first application may be improved. For example, the deployment component 125 may determine whether the run time for a benchmark application 161 (e.g., the time to execute the benchmark application 161) may be decreased, compared to previous run times on other computing devices (e.g., whether the benchmark application executes more quickly or faster). In another example, the deployment component 125 may determine whether a memory usage (e.g., a random access memory usage, a storage size, etc.) of the benchmark application 161 may be decreased. In a further example, the deployment component 125 may determine whether a network bandwidth used by the benchmark application 161 may be decreased. In another embodiment, the deployment component 125 may determine whether a benchmark application 161 can perform additional functions or operations to determine whether the functionality of the first application may be improved. The additional functions, operations, actions, methods, etc., that may be performed by the first application or a benchmark application 161 may be referred to as functionality criteria. For example, a benchmark application 161 may be capable of multi-threaded operation or execution that was previously not used because a previous computing device may not have been capable of multi-threaded execution. In another example, a benchmark application 161 may be capable of stronger encryption because an encryption component may be added to a computing device. In a further example, a benchmark application 161 may be capable of multi-link aggregation because multiple network interface cards may be added to a computing device. In yet another example, a benchmark application may be capable of machine learning (ML) or artificial intelligence (AI) functions because an ML or AI specific processing device (e.g., an AI or ML specific chip) may be added to the computing device.

In one embodiment, the deployment component 125 may recompile the benchmark applications 161 for the computing device 140, based on the components 142 of the computing device 140. For example, the computing device 140 may include a new component 141 (e.g., a new type of processing device, a new type of operating system, a new type of memory or storage, a new software library) that is not included in the computing devices 130 in the computing environment 110 (e.g., does not exist in the other computing devices in the computing environment 110). The deployment component 125 may recompile the benchmark applications 161 using one or more flags, parameters, options, etc., based on the new component 141. For example, new component 141 may be a new type of processing device and the deployment component 125 may recompile the benchmark applications 161 using a compiler flag that may optimize the benchmark applications 161 for execution by the new type of processing device. This may generate new versions of the benchmark applications 161 that are optimized for the new type of processing device. The deployment component 125 may also store the new versions of the benchmark applications 161 on the data store 160. The deployment component 125 may recompile the benchmark applications 161 using source code for the benchmark applications 161. The source code may be stored on the data storage 160 or on another data store.

In one embodiment, the deployment component 125 may execute the new versions of the benchmark applications 161 on the computing device 140 or may cause the new versions of the benchmark applications 161 to be executed on the computing device 140. The deployment component 125 may evaluate or measure one or more performance criteria and functionality criteria for the new versions of the benchmark applications 161. For example, the deployment component 125 may measure the run time, memory usage, bandwidth usage, etc., of the new versions of the benchmark applications 161 to determine whether the performance of one or more of the benchmark applications 161 is improved (e.g., whether the performance of one or more of the new versions of the benchmark applications 161 are improved over previous versions of the benchmark applications 161). In another example, the deployment component 125 may determine whether the new versions of the benchmark applications 161 are capable of performing additional functions, operations, etc.

In one embodiment, the deployment component 125 may determine whether the performance or functionality of the first application 131 may be improved based on the performance criteria or functionality criteria from the execution of the new versions of the benchmark applications 161. For example, the deployment component 125 may determine the types of computational operations that are performed by the first application 131. The deployment component 125 may identify a subset of the benchmark applications 161 that also perform those types of computational operations. The deployment component 125 may determine whether the performance or functionality of the new versions of the subset of benchmark applications 161 have improved on the computing device 140, based on one or more performance criteria or functionality criteria. If the performance or functionality of the new versions of the subset of benchmark applications 161 have improved or changed (e.g., more functionality has been added), the deployment component 125 may determine that the performance or functionality of the first application 131 may also be improved if the first application 131 were executed on the computing device 140.

In one embodiment, the deployment component 125 may recompile the first application 131 for execution on the computing device 140 in response to in response to determining that the performance or functionality of the first application may be improved. For example, the source code for the first application 131 may be stored in the data store 160. The deployment component 125 may recompile the first application 131 with one or more compiler flags, options, parameters, etc., based on the computing device 140. For example, the deployment component 125 may recompile the first application 131 with optimizations for a new type of processing device used in the computing device 140. In another example, the deployment component 125 may recompile the first application using a new software library that is on the computing device 140.

In one embodiment, the deployment component 125 may determine that a computing device within computing environment 110 has been modified. The deployment component 125 may determine that a computing device within the computing environment 110 has been modified by determining that the one or more components 142 of the computing device 140 have been modified, changed, upgraded, updated, etc. For example, the deployment component 125 may determine that a new processing device (e.g., a new GPU) has been installed in the computing device 140. The deployment component 125 may recompile the benchmark applications 161 and evaluate one or more performance criteria or functionality criteria (as discussed above) when the deployment component 125 determines that the computing device 140 has been modified. If the deployment component 125 determines that the component 142 that was modified may increase the performance or functionality of the first application 131, the deployment component 125 may recompile the first application 131 in view of the modified component 142, as discussed above In one embodiment, the deployment component 125 may automatically recompile the first application 131. For example, when the deployment component 125 determines that the performance or functionality of the first application may be improved by executing the application 131 on the computing device 140, the deployment component 125 may automatically recompile the first application 131 for the computing device 140. In another embodiment, the deployment component 125 may provide an indication that the performance of the first application 131 may be improved, to a computing device, such as computing or functionality device 180. For example, the deployment component 125 may transmit a message, packet, frame, etc., to the computing device 180 and the computing device 180 may present or display the message via a graphical user interface (GUI) or other user interface. In another example, the deployment component 125 may transmit a message (e.g., an email, a chat message, a text message, etc.) to one or more users of the computing environment 110 indicating that the performance or functionality of the first application 131 may be improved. The deployment component 125 may receive user input (from a user) via the computing device 180, indicating that the first application should be recompiled. The deployment component 125 may recompile the first application based on the user input.

In one embodiment, the deployment component 125 may recompile the first application 131 by executing the first application 131 on the computing device 140 after the first application 131 has been recompiled. For example, after compiling a new version of the first application 131, the deployment component 125 may execute the new version of the first application 131 on the computing device 140 or may cause the new version of the first application 131 to be executed on the computing device 140 (e.g., may transmit a message to the computing device 140 instructing the computing device to retrieve and execute the new version of the first application 131).

In one embodiment, the deployment component 125 may determine that the performance or functionality of the first application 131 may not be improved, the deployment component 125 may refrain from recompiling the first application 131. For example, if the deployment component 125 determines that the execution of the new versions of the benchmark applications 161 on the computing device 140 is not improved when compared to previous versions of the benchmark applications 161, the deployment component 125 may not recompile the first application 131.

The examples, embodiments, implementations, etc., described herein may allow the computing device 120 and/or the deployment component 125 to continually determine whether the performance or functionality of an application 131 may be improved. Because the deployment component 125 may be aware when a new computing device is added or when components of a computing device are modified, the deployment component 125 may be able to continually determine whether the new computing device or new components allow for improved performance or functionality of an application 131. By recompiling an application 131 to optimize or improve the execution of the application 131 for a new component, the deployment component 125 allows the application 131 (and other applications) to execute more quickly and/or efficiently within the computing environment. In some embodiments, the deployment component 125 may perform these operations, functions, actions, etc., automatically so that the applications 131 can execute more quickly and/or efficiently without user involvement.

Figure 2:
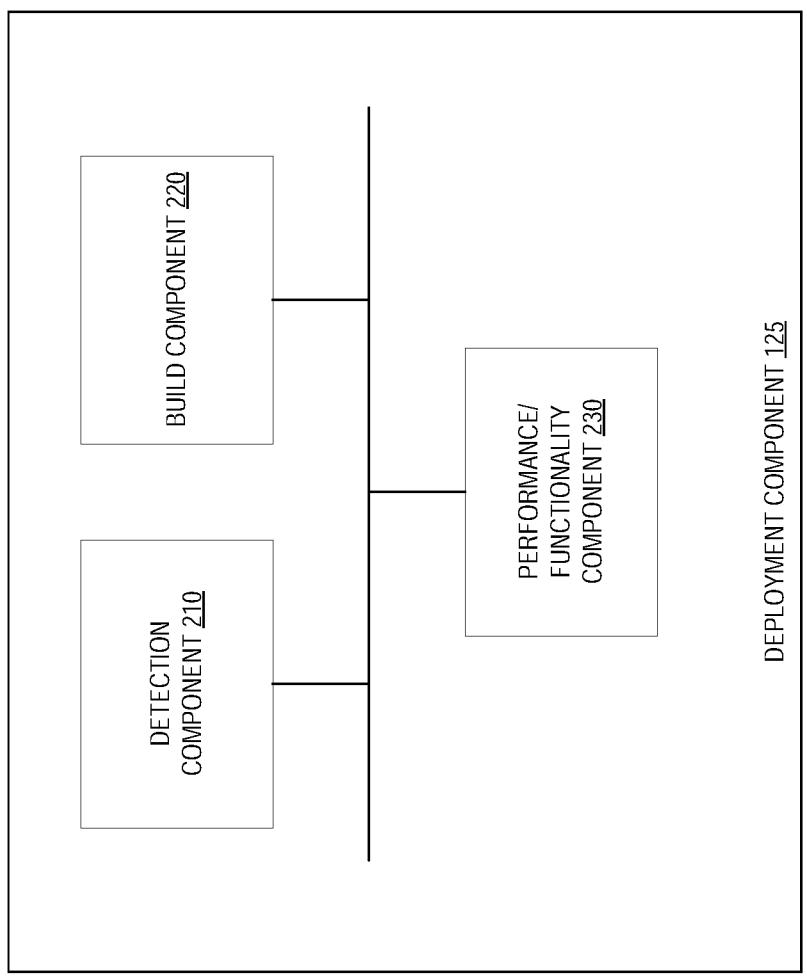
FIG. 2 is a block diagram that illustrates an example deployment component, in accordance with some embodiments of the present disclosure.

FIG. 2 is a block diagram that illustrates an example deployment component 125, in accordance with some embodiments of the present disclosure. As discussed above, the deployment component 125 may be hardware, software, firmware, or combination thereof. The deployment component 125 includes multiple sub-components (e.g., sub-modules) as illustrated in FIG. 2. The deployment component 125 includes a detection component 210, a build component 220, and a performance/functionality component 230. In some embodiments, the different sub-components of the deployment component 125 may be located on different computing devices. For example, the detection component 210 may be on a first computing device, the build component 220 may be on a second computing device, and the performance/functionality component 230

In one embodiment, the detection component 210 may determine that a computing device has been added to a computing environment (e.g., computing environment 110 illustrated in FIG. 2) or that an existing computing device has been modified (e.g., components have been added or removed from an existing computing device). For example, a computing device may register with the detection component 210 when the computing device is added to the computing environment or modified.

In one embodiment, the build component 220 may recompile one or more benchmark applications for the computing device, based on the components of the computing device. For example, the build component 220 may recompile the benchmark applications using one or more flags, parameters, options, etc., based on a new component of the computing device. This may generate new versions of the benchmark applications that are optimized for the new component of the computing device. The build component 220 may also store the new versions of the benchmark applications on the data store. The build component 220 may recompile the benchmark applications using source code for the benchmark applications. The build component 220 may also recompile a first application for execution on the computing device, based on whether the performance or functionality of the first application may be improved.

In one embodiment, the performance/functionality component 230 may determine whether the performance or functionality of the application, may be improved in view of the computing device (e.g., a new computing device or a modified computing device) and one or more benchmark applications. As discussed above, the benchmark applications may also perform one or more of the tasks, actions, functions, operations, methods, processes, calculations, computational operations, etc., performed by the first application. The performance/functionality component 230 may execute the benchmark applications on the computing device to determine whether there may be improvement in performance or functionality if the first application were executed on the computing device. The performance component/functionality 230 may use one or more performance or functionality criteria to determine whether the performance or functionality of the first application may be improved, as discussed above.

If the performance/functionality component 230 determines that the performance or functionality of the first application 131 may be improved based on the performance or functionality criteria the performance/functionality component 230 may cause or instruct the build component 220 to recompile the first application. The build component 220 may recompile the first application with optimizations for the new component used in the computing device. If the performance/functionality component 230 determines that the performance or functionality of the first application 131 may not be improved based on the performance or functionality criteria the performance/functionality component 230 may not recompile the first application (e.g., may refrain from recompiling the first application).

Figure 3:
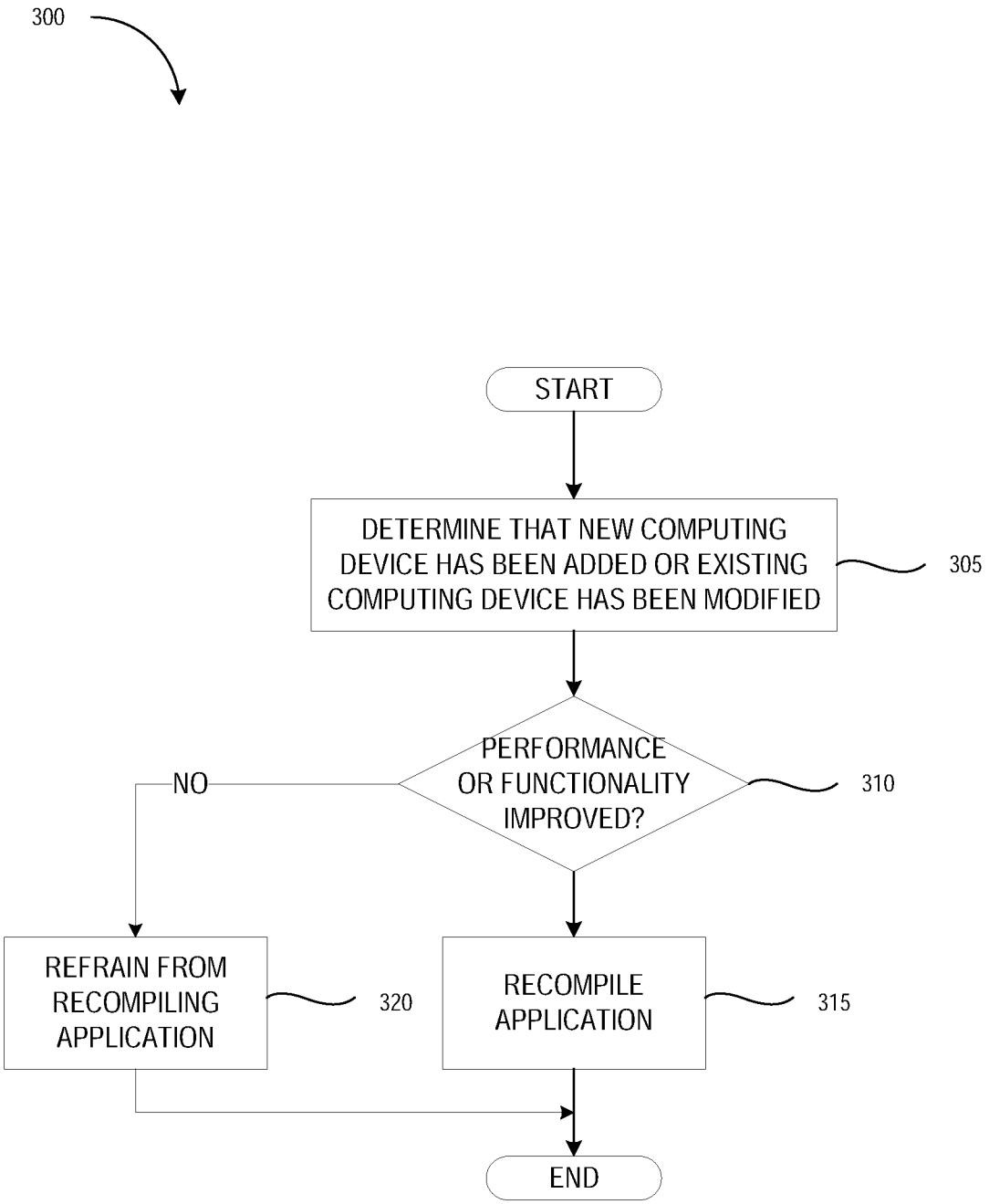
FIG. 3 is a flow diagram of a method of deploying an application in a computing environment, in accordance with some embodiments of the present disclosure.

FIG. 3 is a flow diagram of a method 300 of deploying an application in a computing environment, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by one or more of a deployment component (e.g., deployment component 125 illustrated in FIG. 1) and/or a computing device (e.g., computing device 120 illustrated in FIG. 1), a detection component (as illustrated in FIG. 2), a build component (as illustrated in FIG. 2), and a performance/functionality component (as illustrated in FIG. 2).

The method 300 begins at block 305, where the method 300 determines that a new computing device has been added to a computing environment or that an existing computing device has been modified. For example, a new computing device may register with a server computer when the new computing device is added to the computing environment. In another example, an existing computing device may transmit a message to a server computer when one or more components of the computing device are changed, upgraded, updated, modified, etc.

At block 310, the method 300 may determine whether the performance or functionality of an application that is in the computing environment (e.g., executing or stored in the computing environment) may be improved. For example, the method 300 may determine whether the performance or functionality of an application may be improved if the application is executed on the new or updated computing device. The method 300 may use one or more performance or functionality criteria and one or more benchmark applications, as discussed above. If the performance or functionality of the application may be improved, the method 300 may recompile the application at block 315. For example, the method 300 may recompile the application using compiler flags, options, parameters, etc., that may be used to optimize the application for the computing device or the new component. If the performance or functionality of the application may not be improved, the method 400 may refrain from recompiling the application (e.g., may not recompile the application).

Figure 4:
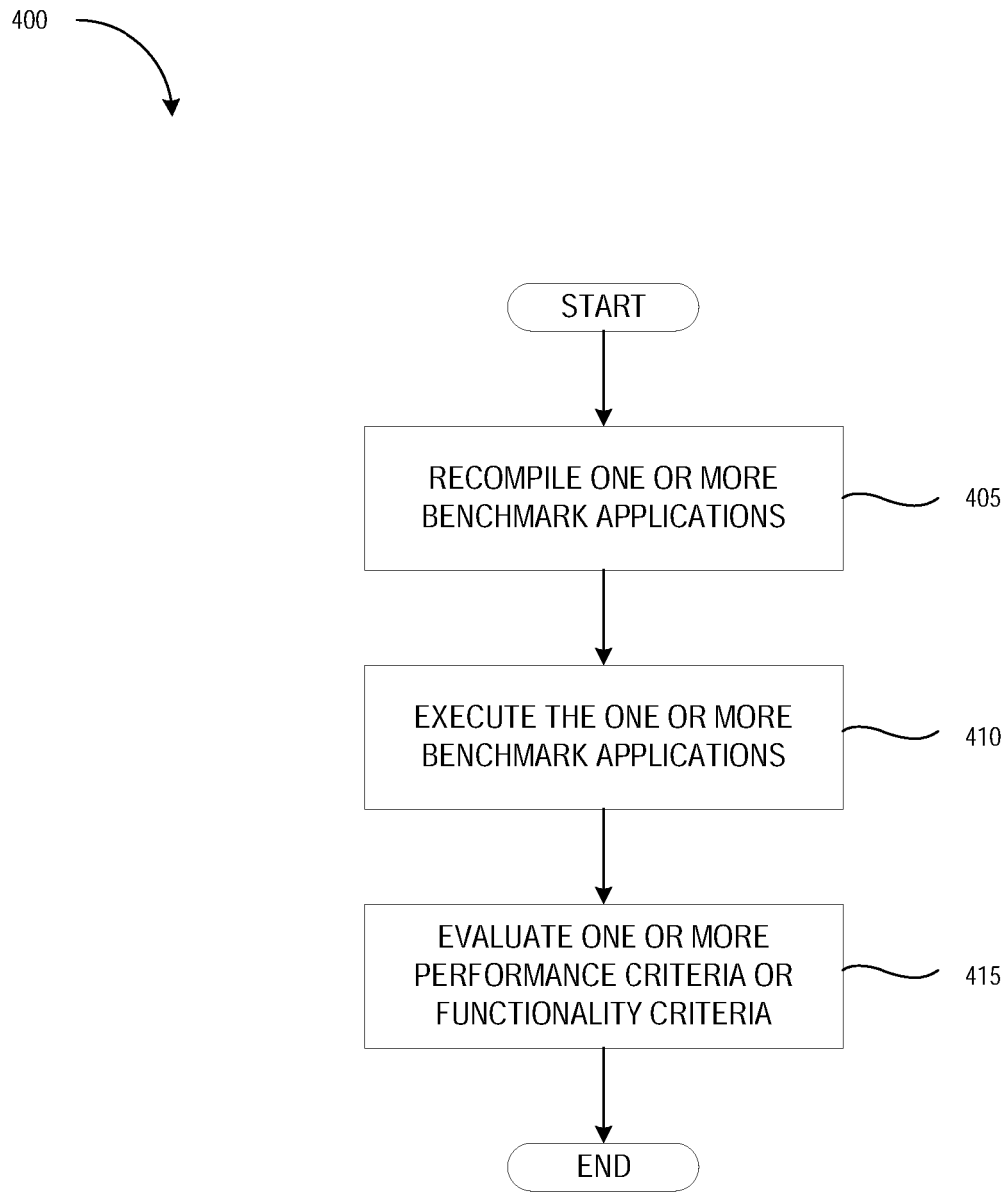
FIG. 4 is a flow diagram of a method of determining whether the performance or functionality of an application may be improved, in accordance with some embodiments of the present disclosure.

FIG. 4 is a flow diagram of a method 400 of determining whether the performance or functionality of an application may be improved, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by one or more of a deployment component (e.g., deployment component 125 illustrated in FIG. 1) and/or a computing device (e.g., computing device 120 illustrated in FIG. 1), a detection component (as illustrated in FIG. 2), a build component (as illustrated in FIG. 2), and a performance/functionality component (as illustrated in FIG. 2).

The method 400 begins at block 405, where the method 400 recompiles one or more benchmark applications for a computing device (e.g., a new or modified computing device) that has one or more components that are not included in a computing environment. For example, the method 400 may recompile the one or more benchmark applications using compiler optimizations, flags, parameters, that may optimize the one or more benchmark applications for the one or more components. At block 410, the method 400 may execute the one or more benchmark applications. For example, the method 400 may execute the one or more benchmark applications on the computing device. The method 400 may store or record performance or functionality criteria or metrics during the execution of the benchmark applications. For example, the method 400 ma record the amount of time it takes for the benchmark applications to execute, the amount of memory used, etc. At block 415, the method 400 may evaluate one or more performance or functionality criteria to determine whether the performance or functionality of a separate application may be improved, based on the performance or functionality criteria or metrics of the one or more benchmark applications, as discussed above.

Figure 5:
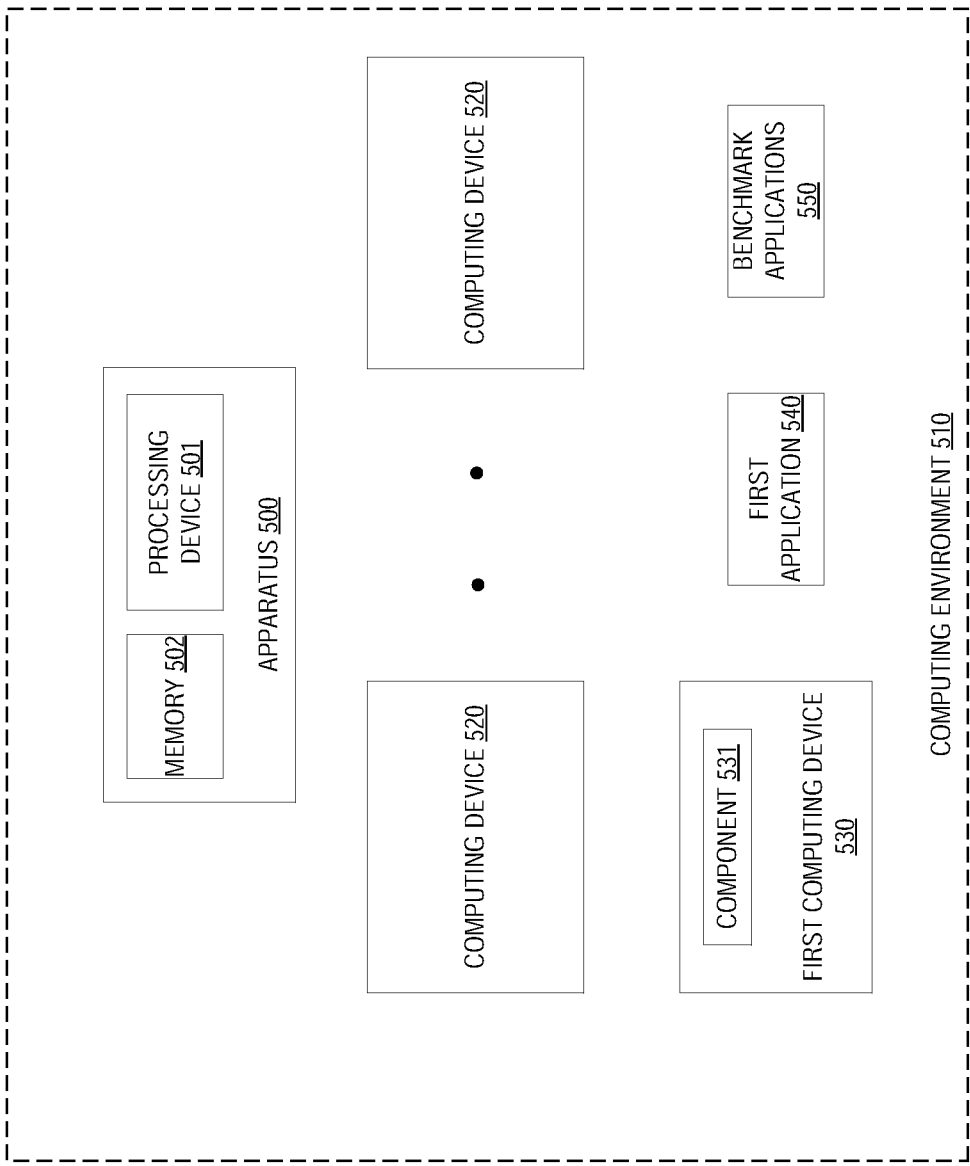
FIG. 5 is a block diagram of an example apparatus that may perform one or more of the operations described herein, in accordance with some embodiments.

FIG. 5 is a block diagram of an example apparatus 500 that may perform one or more of the operations described herein, in accordance with some embodiments. The apparatus 500 includes a processing device 501 and a memory 502. The processing device 501 may be operatively coupled to the memory 502. The processing device 501 may determine that the first computing device 530 has been added to a computing environment 510 comprising a plurality of computing devices 520. The first computing device 530 includes a first component 531 that is not included in the plurality of computing devices 520. The processing device 501 may determine whether a performance or functionality of a first application 540 may be improved in view of the first computing device 530 and a plurality of benchmark applications 550. The first application is 540 within the computing environment 510. In response to determining that the performance or functionality of the first application may be improved, the processing device 501 may recompile the first application 540 for execution on the first computing device 530.

Figure 6:
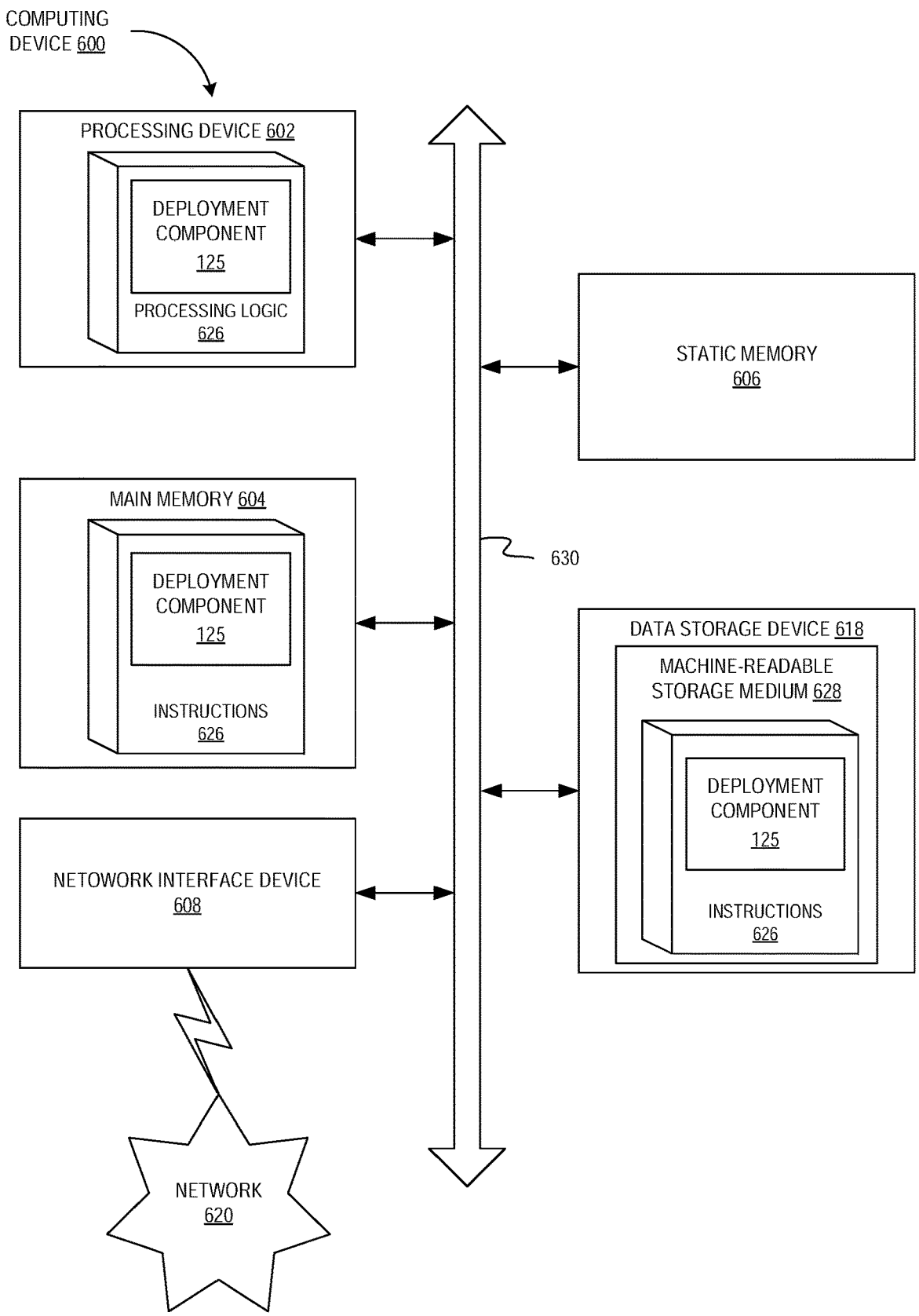
FIG. 6 is a block diagram of an example apparatus that may perform one or more of the operations described herein, in accordance with some embodiments

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of deployment component 125 of FIG. 1, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute deployment component 125. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for multi-level task debugging, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:
   determining, by a processing device, that a first computing device has been added to a computing environment, the computing environment comprising a plurality of computing devices executing a plurality of benchmark applications and a first application, the plurality of benchmark applications to execute one or more tasks performed by the first application, wherein the first computing device comprises a first component that is not included in the plurality of computing devices;
   in response to determining that the first computing device has been added to the computing environment recompiling the plurality of benchmark applications to execute on the first computing device in view of the first component;
   determining, by the processing device, whether a functionality of the first application may be improved in view of the plurality of benchmark applications as executed on the first computing device;
   in response to determining that the functionality of the first application may be improved, recompiling the first application for execution on the first computing device; and
   in response to determining that the functionality of the first application may not be improved, refraining from recompiling the first application for execution on the first computing device.

2. The method of claim 1, wherein determining whether the functionality of the first application may be improved comprises:
   executing the plurality of benchmark applications on the first computing device; and
   evaluating one or more functionality criteria for the plurality of benchmark applications.

3. The method of claim 1, wherein recompiling the plurality of benchmark applications comprises:
   recompiling the plurality of benchmark applications using one or more compiler flags in view of the first computing device.

4. The method of claim 1, wherein the first application and at least one of the plurality of benchmark applications perform a first type of computational operation.

5. The method of claim 1, wherein recompiling the first application comprises:
   automatically recompiling the first application.

6. The method of claim 1, wherein recompiling the first application comprises:
   providing an indication that the functionality of the first application may be improved to a computing device;
   receiving user input from the computing device; and
   recompiling the first application based on user input.

7. The method of claim 1, wherein recompiling the first application comprises:
   executing the first application on the first computing device.

8. The method of claim 1, wherein the first component comprises a one or more of:
   new type of processing device;
   a new type of storage device;
   a new type of network communication device;
   a new type of operating system (OS); or
   a new software library.

9. The method of claim 1, wherein the first computing device comprises one or more of:
   a virtual machine;
   a container; or
   a physical device.

10. An apparatus, comprising:
    a memory; and
    a processing device, operatively coupled to the memory, to:
      determine that a first computing device has been added to a computing environment, the computing environment comprising a plurality of computing devices executing a plurality of benchmark applications and a first application, the plurality of benchmark applications to execute one or more tasks performed by the first application, wherein the first computing device comprises a first component that is not included in the plurality of computing devices;
      in response to determining that the first computing device has been added to the computing environment, recompile the plurality of benchmark applications to execute on the first computing device in view of the first component;
      determine whether a functionality of the first application may be improved in view of the plurality of benchmark applications as executed on the first computing device;

in response to determining that the functionality of the first application may be improved, recompile the first application for execution on the first computing device; and in response to determining that the functionality of the first application may not be improved, refrain from recompiling the first application for execution on the first computing device.

11. The apparatus of claim 10, wherein to determine whether the functionality of the first application may be improved the processing device is further configured to:

executing the plurality of benchmark applications on the first computing device; and evaluating one or more functionality criteria for the plurality of benchmark applications.

12. The apparatus of claim 10, wherein to recompile the plurality of benchmark applications the processing device is further configured to:

recompile the plurality of benchmark applications using one or more compiler flags in view of the first computing device.

13. The apparatus of claim 10, wherein the first application and at least one of the plurality of benchmark applications perform a first type of computational operation.

14. The apparatus of claim 10, wherein to recompile the first application the processing device is further configured to:

automatically recompile the first application.

15. The apparatus of claim 10, wherein to recompile the first application the processing device is further configured to:

provide an indication that the functionality of the first application may be improved to a computing device;

receive user input from the computing device; and recompile the first application based on user input.

16. The apparatus of claim 10, wherein to recompile the first application the processing device is further configured to:

execute the first application on the first computing device.

17. The apparatus of claim 10, wherein the first component comprises a one or more of:

new type of processing device;

a new type of storage device;

a new type of network communication device;

a new type of operating system (OS); or a new software library.

18. A non-transitory computer-readable storage medium including instructions that, when executed by a processing device, cause the processing device to:

determine that a first computing device has been added to a computing environment, wherein:

the computing environment comprises a plurality of computing devices executing a plurality of benchmark applications and a first application, the plurality of benchmark applications to execute one or more tasks performed by the first application; and the first computing device comprises a first component that is not included in the plurality of computing devices;

in response to determining that the first computing device has been added to the computing environment recompile the plurality of benchmark applications to execute on the first computing device in view of the first component;

determine whether a functionality of the first application may be improved in view of the plurality of benchmark applications as executed on the first computing device;

in response to determining that the functionality of the first application may be improved, recompile the first application for execution on the first computing device; and in response to determining that the functionality of the first application may not be improved, refrain from recompiling the first application for execution on the first computing device.

\* \* \* \* \*